United States Patent [19]

Bona et al.

[11] 4,172,040

[45] Oct. 23, 1979

[54] SEDIMENT RAKING DEVICE

[75] Inventors: József Bóna; Lászlo Máhig; Mihály Márton; János Steiner, all of Budapest, Hungary

[73] Assignee: Aluminiumipari Tervezo es Kutato Intezet, Budapest, Hungary

[21] Appl. No.: 952,931

[22] Filed: Oct. 19, 1978

[51] Int. Cl.² .................................................. B01D 21/18
[52] U.S. Cl. ........................................ 210/528; 210/531
[58] Field of Search ........... 210/83, 523, 525, 528–531

[56] References Cited

U.S. PATENT DOCUMENTS

| | | | |
|---|---|---|---|
| 3,295,835 | 1/1967 | Klopper | 210/528 X |
| 3,542,207 | 11/1970 | Stansmore | 210/528 X |
| 3,833,126 | 9/1974 | Schochet et al. | 210/531 |
| 4,000,075 | 12/1976 | Wooh | 210/528 X |

*Primary Examiner*—William A. Cuchlinski, Jr.
*Attorney, Agent, or Firm*—Young & Thompson

[57] ABSTRACT

In a sediment raking device with a centrally arranged rotated torque tube, radially arranged booms and rake arms between said booms at a lower level a link rod is provided between the rake arms and the torque tube which is connected to the rake arm by a hinge and to the torque tube by a universal joint (FIG. 1).

1 Claim, 3 Drawing Figures

U.S. Patent
Oct. 23, 1979
4,172,040
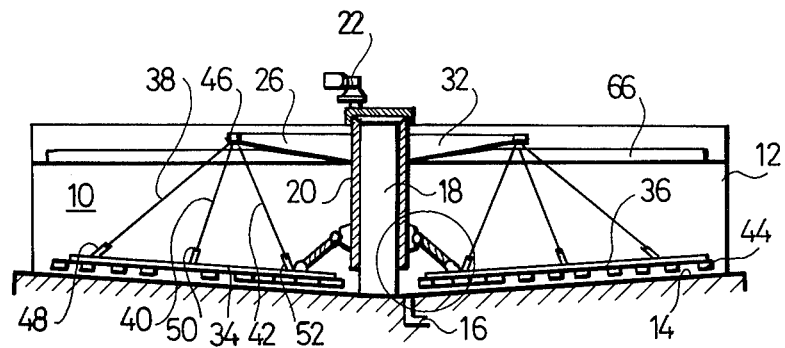
FIG. 1
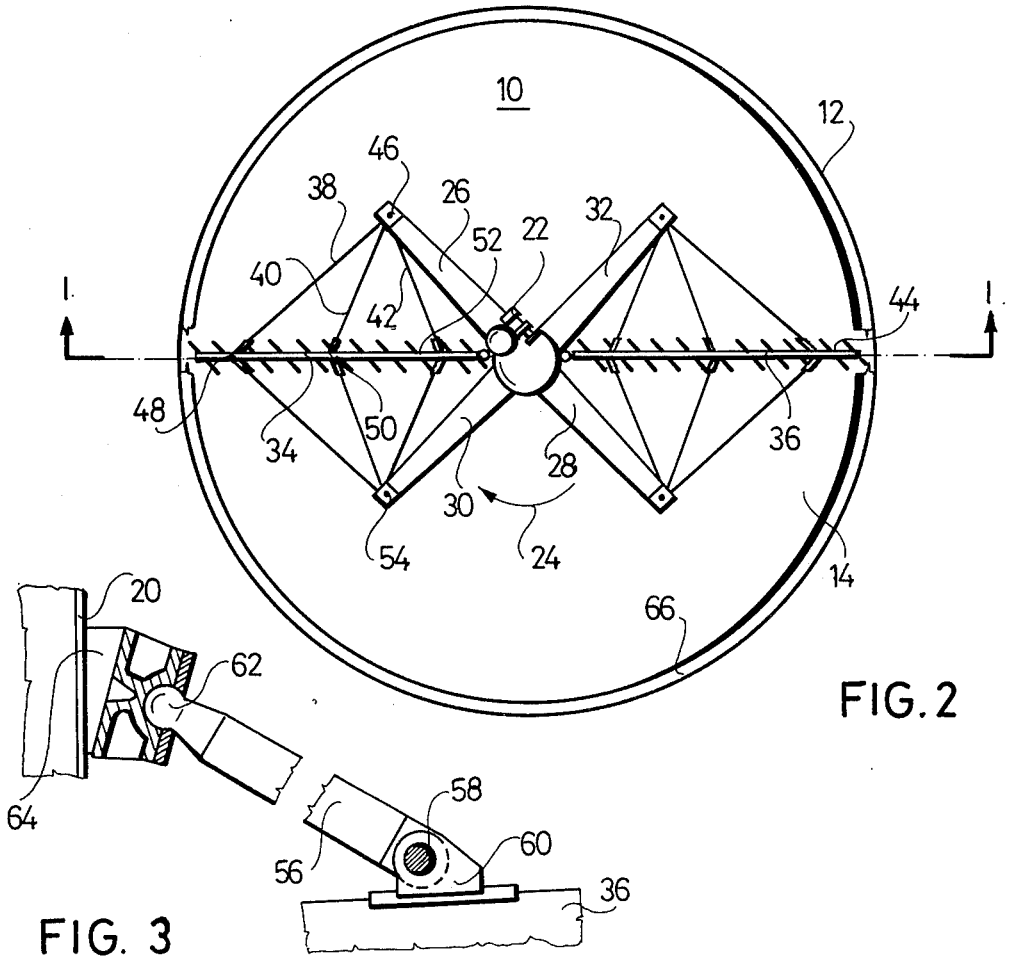
FIG. 2
FIG. 3

SEDIMENT RAKING DEVICE

BACKGROUND OF THE INVENTION

This invention relates to a sediment raking device for sedimentation tanks.

As is known, solids in slurries are separated from the liquid component of the slurry by sedimentation in thickeners the main parts of which are a settling tank for holding a generally quiescent pool of liquid, and slow-moving rakes trailed along the bottom thereof. The rakes are destined to urge settled sludge to a discharge sump. If the solid-liquid ratios of slurry inputs are uniform, the raking devices work dependably. Surges of solids, however, may result in localized solid deposits which impede the trailing motion of the rake blades. Then, the rakes may be damaged unless special steps are taken.

It has been suggested to meet such difficulties by coupling the rake arms to the shaft of their rotation by universal joints so that in response to overload the rake arms pivot upwardly about a horizontal axis and reerward about a vertical axis of their universal joint. The lifted arms shave the deposit and, upon subsequent passes, wear it away.

Such sediment raking device is described in U.S. Pat. No. 3,833,126 which gives a full account of the parts of such and their various functions. Therefore, the prior specification is hereby incorporated by reference.

With the known suggestion, the rake arms have their inner ends pivotally connected to the lower end of a centrally disposed torque tube or cage. Thus, when a rake arm encounters a large solids accumulation, or overload, resistance increases, the raking arm pivots about its pin upward and back thereby reducing its bite into the sludge.

However, the rake arms which work in the manner of single-arm levers may bend due to their own weights and may flex when they encounter an obstacle. Overloads will occur particularly when in the proximity of the axis of raking arm rotation sludge accumulates and causes the raking arms to be lifted at relatively short arms while their greater length is without support and their pivotal connections with the torque tube are loaded by shearing forces.

SUMMARY OF THE INVENTION

The main object of the invention is to eliminate the aforesaid inconveniences and to provide a raking device of the above described type wherein the raking arms are permitted to be lifted without any substantial additional bending or shearing loads on them and their pivotal connections, respectively. The basic idea of the invention consists in adding a further degree of freedom to the connection between the raking arms and the torque tube by which the former are enabled to accommodate themselves to dislevelments of a layer of settled sludge by assuming oblique positions in either direction irrespective of the distance of an obstacle from the axis of rotation. Such additional degree of freedom is obtained, in compliance with the main feature of the invention, by a link rod between a rake arm and the torque tube, the link rod being connected to the rake arm by a hinge, and to the torque tube by a universal joint as will be explained hereinafter in closer details by taking reference to the drawing.

BRIEF DESCRIPTION OF THE DRAWING

FIG. 1 is an elevation in section taken along line I—I of FIG. 2 of a thickener tank in which the invention is embodied, FIG. 2 is a top view of the thickener illustrated in FIG. 1, and FIG. 3 is a view of a detail on an enlarged scale showing the very gist of the invention.

DESCRIPTION OF THE PREFERRED EMBODIMENT

In the drawing a thickener of typical construction is shown. It includes a settling tank 10 having a marginal sidewall 12 and a circular bottom 14 which slopes downwardly toward a central discharge pipe 16.

As illustrated, a central pier 18 supports a vertical column or torque-tube 20 which is centrally located in the tank. A drive 22 comprising a motor and a gear drive is mounted on the central pier 18 and is coupled to the torque-tube 20 to effect rotation thereof about its vertically disposed longitudinal axis in the direction indicated by a curved arrow 24 in FIG. 2.

In the instant case, two pairs of elevated booms 26, 28 and 30, 32 are cantilevered from torque-tube 20 to extend in opposite radial directions over the tank bottom 14. The booms 26 to 32 are fixed to the torque-tube 20 and rotate therewith. They may be of a truss or tubular design to withstand significant loading. A pair of radially directed rake arms 34 and 36 are suspended from the booms 26, 28, and 30, 32, respectively by a plurality of draft means such as cables 38, 40, 42, and pulled over the tank bottom 14.

In practice, the rake arms 34, and 36 consist of an elongated rigid but light tubular member to which blades in the form of rectangular plates are fixed at selected angles. One of the blades is referred to by reference numeral 44 in FIGS. 1 and 2. The rake blades 44 serve for sweeping settled sludge across the tank bottom 14.

As shown in FIGS. 1 and 2, the rake arms 34 and 36 have an angular displacement by an acute angle to a horizontal plane relative to their associated booms 26, 30 and 28, 32, respectively. In the instant case, the lag angle is roughly 45° while the angles mutually enclosed by the booms 26, 28, 30 and 32 amount to 90° each. The cables 38, 40 and 42 connect an outboard point 46 of boom 26 with spaced-apart support points 48, 50 and 52 of the rake arm 34. The support points 48, 50 and 52 of rake arm 34 are connected, in turn, with an outboard point 54 of the trailing boom 30 of boom 26. Similar arrangements are provided for rake arm 36 and its associated booms 28 and 32.

In compliance with the main feature of the invention, the rake arms 34 and 36 are, in contrast to known devices, not directly connected to the torque-tube 20. Instead, link rods are provided therebetween such as link rod 56 between rake arm 36 and torque-tube 20 in FIG. 3. It will be seen that link rod 56 is connected to rake arm 36 by a hinge 58 which is fixed thereon by means of a clevis 60. The other extremity of link rod 56 is connected to the torque-tube 20 by means of a universal or ball joint 62 the bearing of which is fixed to the torque-tube 20 likewise by means of clevises such as clevis 64. The significance of such arrangement will further be explained in connection with the operation of the device.

Reference numeral 66 refers to a peripheral launder common with thickeners of the above described type which are equipped also with elevated conduits for incoming feed flowing therethrough into a cylindrical feedwall so as to be dispersed into the tank 10. Peripheral launders may serve for discharging clarified effluent. Walkways traversing the tank 10 may likewise be employed. All such accessories are well known in the art and, for sake of clarity, not represented in the drawing.

In operation, incoming feed flows through the elevated feed conduit into the feedwell wherefrom it is dispersed into tank 10. Clarified effluent flows into the launder 66 and is discharged in a manner known per se. Sludge settles on the bottom 14 of the tank 10 and forms a layer there which the raking device is destined to remove by urging it towards the discharge pipe 16. For this purpose, the drive 22 is started whereupon the leading booms 26 and 28 trail their associated rake arms 34 and 36, respectively, along the bottom 14 of tank 10. Since bottom 14 is sloping towards its center, sludge is caused by the blades 44 to slowly proceed inwards until it reaches the discharge pipe 16 and withdraws therethrough.

Since the systems of booms, rake arms and cables are adjusted so that the blades 44 are just clear of the bottom 14 of tank 10, operation is even as long as the sludge layer is uniform and, therefore, its resistance to the blades 44 is constant. When the rake arms encounter an unusual accumulation of settled solids, resistance to raking increases with a resultant increase in the tension on the draft means or cables 38, 40 and 42. Under these circumstances, there is an upward component introduced which forces the rake arms to move upwardly so that the blades take an increasingly shallower bite until the weight of the arm equals the upward force component. In other words, the arm raises in response to lifting forces which exceed the effective weight of the arm. So far the thickener operates almost in a known manner.

It is, however, significant that the rake arms are raised roughly parallel to their original positions instead of being rotated in a vertical plane around a hinge as is the case with the known devices. It means that the sludge layer is uniformly bitten and consumed irrespective of the distances from the tank center. Moreover, the rake arms are enabled to easily yield to sudden resistances caused by local solids accumulations such as clogs of undiluted sludge or lumps of other solid slurry components. This is of high importance in the central regions of the tank bottom as has hereinbefore been hinted at and can easily be appreciated. If a rake arm, e.g. the rake arm 36 encounters a clog or lump in the proximity of its radially inward end which is too big or too heavy to be urged by the blades towards the discharge pipe 16, the rake arm will perform an angular displacement around its hinge 58 in the clockwise direction while the link rod 56 rotates in the anti-clockwise sense around its universal joint 62 on the torque-tube 20. Obviously, neither of both the hinge 58 and the universal joint 62 is thereby exposed to any stresses while the rake arm 36 proper will practically be lifted highest just where it encounters the clog or lump and is supported thereby, in contrast to known devices where in such case the rake arms are lifted around a point in the center of the tank at a very short arm and have to bear all their own weight in the manner of a cantilever or console.

Although the invention has been described in connection with a center pier machine in which a stationary central pier supports both the drive mechanism and a rake arm supporting torque-tube or cage, it is equally useful in so-called beam-type thickeners in which the drive and rake assembly are supported by a superstructure spanning the tank. The same applies to the tank bottom which, with the represented embodiment, slopes inwardly. In case of outwardly sloping tank bottoms settled sludge will obviously be urged towards the periphery. Otherwise, the structure is what it was in the illustrated case.

The represented embodiment was equipped with one pair of rake arms. Obviously, less or more rake arms might be employed as well. Each rake arm is associated with a pair of booms. However, the booms may be common to more than one rake arm of a thickener. In such cases, e.g. four rake arms are associated but with altogether four booms each of which, then, is connected to the support points of two different but adjacent rake arms.

What we claim is:

1. A sediment raking device for sedimentation tanks comprising:
   a. a centrally arranged rotatable torque tube;
   b. drive means for rotating said torque tube around a vertical axis;
   c. a pair of radially arranged booms cantilevered to said torque tube at an elevated level;
   d. a radially disposed rake arm at a lower level arranged for rotation with said torque tube above the bottom of a sedimentation tank;
   e. said rake arm having an angular displacement in a horizontal plane relative to said booms by an acute angle of preferably 45°;
   f. rake blades transversely arranged on said rake arm adapted to be pulled over the bottom of said sedimentation tank substantially parallel thereto;
   g. draft means connecting an outboard point of each of said booms with said rake arm at spaced-apart support points;
   h. a link rod between said rake arm and said torque tube, said link rod being connected to said rake arm by a hinge, and to said torque tube by a universal joint.

* * * * *